United States Patent
Adachi et al.

(10) Patent No.: US 6,857,939 B2
(45) Date of Patent: Feb. 22, 2005

(54) DICING MACHINE WITH INTERLOCK

(75) Inventors: Tadashi Adachi, Mitaka (JP);
Masayuki Azuma, Mitaka (JP);
Takayuki Kaneko, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 2 days.

(21) Appl. No.: 10/143,830

(22) Filed: May 14, 2002

(65) Prior Publication Data

US 2002/0166552 A1 Nov. 14, 2002

(30) Foreign Application Priority Data

May 14, 2001 (JP) ........................................ 2001-143504

(51) Int. Cl.$^7$ ........................... B24B 55/00; B28D 1/04; B26D 1/14
(52) U.S. Cl. ............................... 451/6; 451/8; 451/451; 83/62.1; 83/399; 83/478; 83/481; 83/DIG. 1; 125/13.01
(58) Field of Search ........................... 83/62, 62.1, 397, 83/478, 399, 481, DIG. 1; 125/13.01, 13.03, 20; 451/5, 6, 8, 9, 21, 451–456

(56) References Cited

U.S. PATENT DOCUMENTS 1,794,758 A * 3/1931 Dittmar ..................... 83/478
3,843,871 A * 10/1974 Fujimaki et al. ......... 83/62.1 X
4,558,686 A * 12/1985 Ono ......................... 125/13.01
5,031,360 A * 7/1991 Farnworth et al. ............. 451/6
6,010,396 A * 1/2000 Ohmiya ..................... 451/450
6,552,811 B2 * 4/2003 Hayashi ..................... 356/614
6,732,612 B2 * 5/2004 Adachi et al. ............. 83/481 X

FOREIGN PATENT DOCUMENTS

| JP | 10-116802 | 5/1998 |
| JP | 11-144557 | 5/1999 |

* cited by examiner

*Primary Examiner*—Clark F. Dexter
(74) *Attorney, Agent, or Firm*—Nixon Peabody LLP; David S. Safran (57) ABSTRACT

A dicing machine including a flange cover which covers the blade and is divided into two such that a first cover is openable. An interlock device is provided so that a blade attaching and detaching device cannot be attached when the first cover is at the closing position, the first cover cannot turn to the closing position when the blade attaching and detaching device is attached, and the processing of the work is not started when detected radiation of a blade breakage detector, attached to the first cover, is not reduced by a predetermined amount. Consequently, the blade and the work are prevented from being damaged by processing the work without applying coolant, the mechanism of the dicing machine and the blade attaching and detaching device are prevented from being damaged without detaching the blade attaching and detaching device, and the work is prevented from being being unprocessed.

2 Claims, 7 Drawing Sheets

DICING MACHINE WITH INTERLOCK

BACKGROUND OF THE INVENTION

1. Field of the Invention

The present invention relates to a dicing machine which dices a work or semiconductor wafer and so on, and more specifically, to a dicing machine provided with an interlock for preventing the dicing machine from being improperly set in motion.

2. Description of the Related Art

In the dicing machine, a rotary blade rotates at a high speed and dices a work or a semiconductor wafer. Parts of the blade except a cutting part are covered with a flange cover. The flange cover is provided with a pair of nozzles, through which cutting solution is jetted to both sides of the blade which is cutting the work. An optical blade breakage detector, which detects breakage of the blade, is attached to the flange cover so that detecting parts of the blade breakage detector face to each other across the edge of the blade. Since the nozzle and the blade breakage detector may obstruct replacement of the blade, the flange cover is divided into two, and the nozzle and the blade breakage detector are attached to one of the divided covers that is turnably arranged on an axis perpendicular to the blade.

When the blade is replaced with a new one, the turnable cover is turned to an upper direction so as to move the nozzles and the blade breakage detector away from the blade. Moreover, when the blade is replaced, a blade attaching and detaching device is attached to the other divided cover or stationary flange cover, so as to detach the old blade and attach a new blade. In the conventional dicing machine, when the blade is replaced, the operator turns the turnable cover to the opening position, and attaches the blade attaching and detaching device on the stationary flange cover. However, there are cases where the operation of the dicing machine is resumed while the blade attaching and detaching device is still installed to the flange cover after the replacement of the blade, or the operation of the dicing machine is resumed while the blade attaching and detaching device is removed but the operator forgets to return the turnable cover from the opening position to the closing position. Moreover, there is an extreme case that after removing the blade, the operator leaves the dicing machine once and does another job, and when the operator returns to the dicing machine, the operator forgets to attach a new blade before resuming the operation of the dicing machine.

In the case that the blade attaching and detaching device remains installed, the blade attaching and detaching device interferes with other parts of the mechanism of the dicing machine, and not only the blade attaching and detaching device but also other parts of the mechanism are greatly damaged. In the case that the turnable cover remains opened, the coolant jetted from the nozzles is not applied to the blade, so that both the blade and the work being processed are damaged. In the case that the blade remains detached, the dicing machine determines that the work that has not been processed finishes being processed, and sends out the unprocessed work.

SUMMARY OF THE INVENTION

The present invention has been achieved considering these situations, and has an object to provide a dicing machine with an interlock that can prevent at least one of the flange cover from remaining opened, the blade attaching and detaching device from remaining installed, and the rotary blade from remaining detached, when resuming the operation of the dicing machine after replacement of the rotary blade.

In order to attain the above described object, the present invention is directed to a dicing machine which processes a work with a rotary blade, the dicing machine comprising: a spindle on which the rotary blade is attached and rotated; a turnable cover which covers the rotary blade during processing of the work, the turnable cover being turned from a closing position to an opening position when replacing the rotary blade, the turnable cover being returned from the opening position to the closing position when resuming the processing; and an interlock device which prevents the turnable cover from remaining opened when resuming the processing.

According to the present invention, the turnable cover is turned from the closing position to the opening position for replacement of the rotary blade, and the dicing machine is provided with the interlock device which prevents the turnable cover from being not returned from the opening position to the closing position after the replacement, so that the operation is not initiated while the turnable cover is positioned at the opening position. Thus, the coolant which is necessary for processing is applied from a nozzle provided to the turnable cover, so that both the blade and the work are not damaged.

In order to attain the above described object, the present invention is directed to a dicing machine which processes a work with a rotary blade, the dicing machine comprising: a spindle on which the rotary blade is attached and rotated; a turnable cover which covers the rotary blade during processing of the work, the turnable cover being turned from a closing position to an opening position when replacing the rotary blade, the turnable cover being returned from the opening position to the closing position when resuming the processing; and an interlock device which prevents the rotary blade from remaining detached when resuming the processing.

According to the present invention, the dicing machine is provided with an interlock device which prevents the rotary blade from remaining detached, so that the operation cannot be initiated without the blade. Thus, the work that has not been processed is not transferred from the dicing machine to the next process.

In order to attain the above described object, the present invention is directed to a dicing machine which processes a work with a rotary blade, the dicing machine comprising: a spindle on which the rotary blade is attached and rotated; a stationary cover and a turnable cover which cover the rotary blade during processing of the work, the turnable cover being turned from a closing position to an opening position and a blade attaching and detaching device being mounted on the stationary cover when replacing the rotary blade, the turnable cover being returned from the opening position to the closing position and the blade attaching and detaching device being detached from the stationary cover when resuming the processing; and an interlock device which prevents the blade attaching and detaching device from remaining mounted on the stationary cover when resuming the processing.

According to the present invention, the dicing machine is provided with an interlock device which prevents the blade attaching and detaching device, which is used for exchanging the rotary blades, from remaining installed after the replacement of the blade, so that the operation is not initiated while the blade attaching and detaching device is attached. Thus, the mechanism of the dicing machine and the blade attaching and detaching device are prevented from being damaged by operating the dicing machine without detaching the blade attaching and detaching device.

Preferably, the interlock device prevents the blade attaching and detaching device from being mounted when the turnable cover is positioned at the closing position; and the interlock device prevents the turnable cover from being turned to the closing position when the blade attaching and detaching device is mounted.

According to the present invention, the blade attaching and detaching device cannot be attached when the turnable cover is at the closing position, and the turnable cover cannot return to the closing position when the blade attaching and detaching device is attached. By confirming that the turnable cover is positioned at the closing position, it can be confirmed that the blade attaching and detaching device is removed. Thus, the operator has only to confirm that the turnable cover is positioned at the closing position so as to prevent the turnable cover from remaining opened and the blade attaching and detaching device from remaining installed.

Preferably, the dicing machine further comprises: a blade breakage detector which detects breakage of the rotary blade, the blade breakage detector being arranged on the turnable cover, wherein the interlock device is controlled under a signal applied from the blade breakage detector.

According to the present invention, the interlock device works with a detecting signal of a blade breakage detector that detects breakage of the rotary blade. The blade breakage detector is used both for detecting the breakage of the blade and for detecting the signal for the interlock. Thus, the interlock device can prevent the turnable cover from remaining opened, the rotary blade from remaining detached, and the blade attaching and detaching device from remaining installed without using the special detector.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder a dicing machine with an interlock according to an embodiment of the present invention will be described in detail in accordance with the accompanied drawings.

Figure 1:
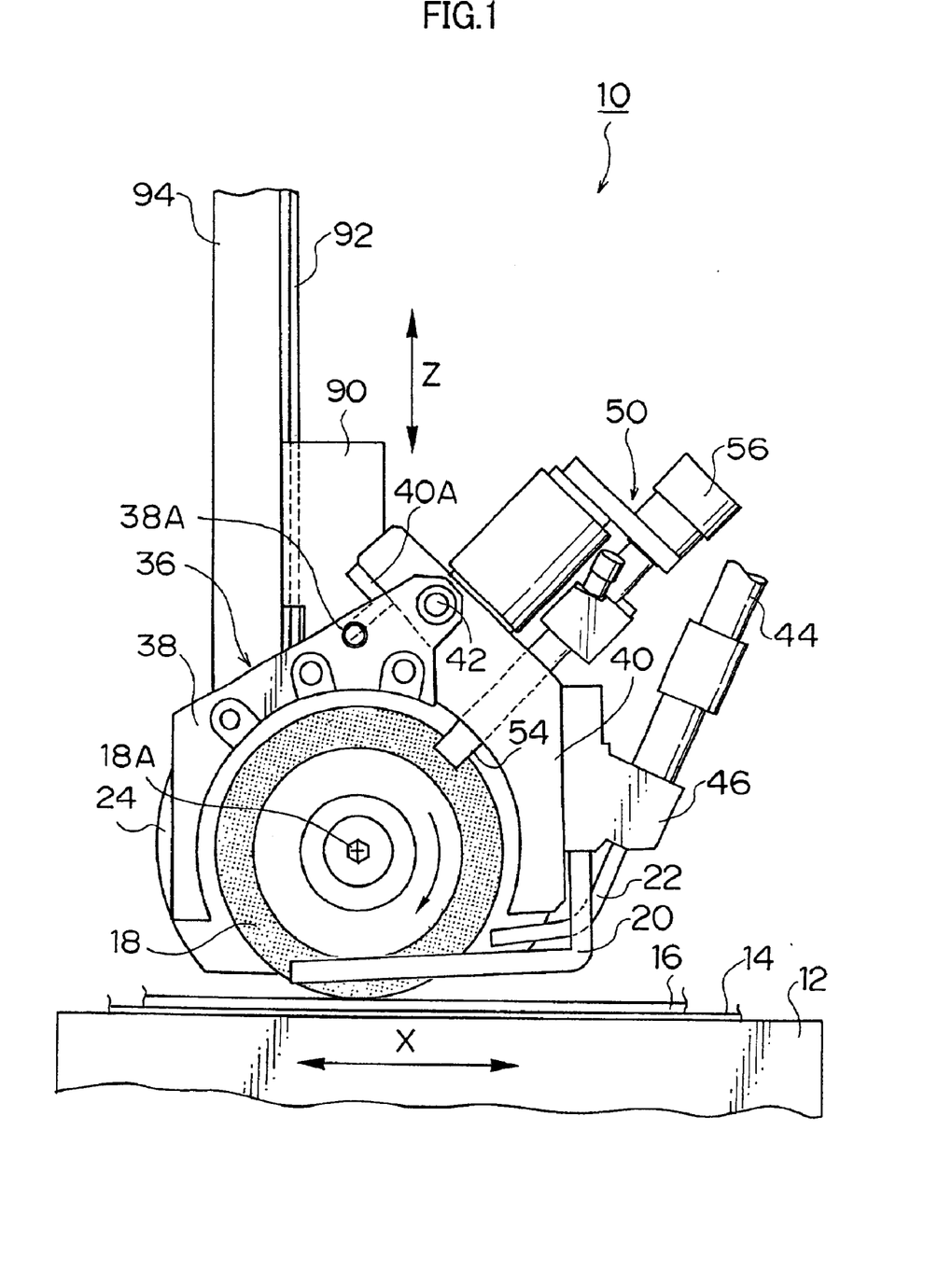
FIG. 1 is a front view of a dicing machine with an interlock according to an embodiment of the present invention.
Figure 2:
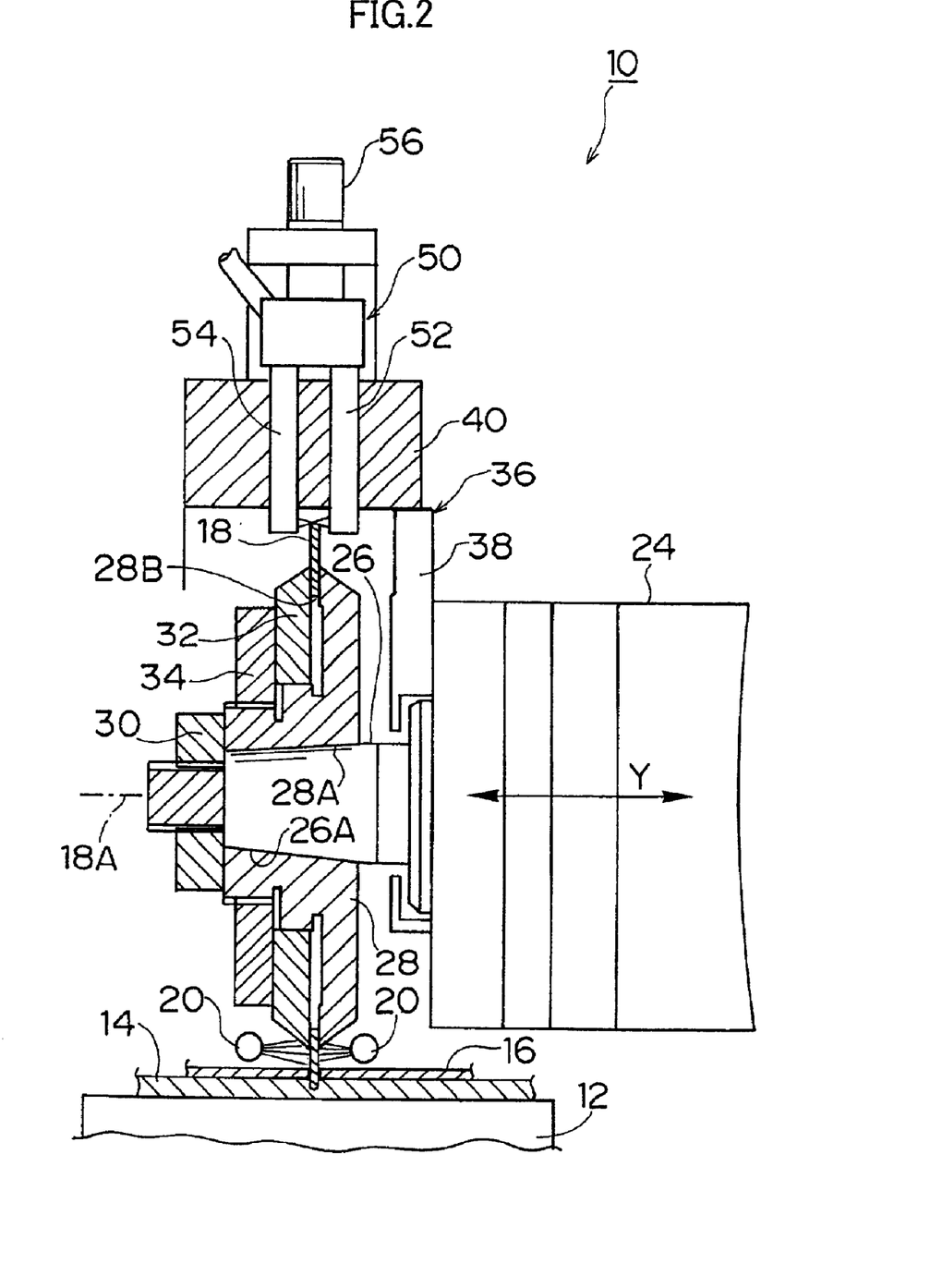
FIG. 2 is a sectional side view of the dicing machine in FIG. 1.
Figure 3:
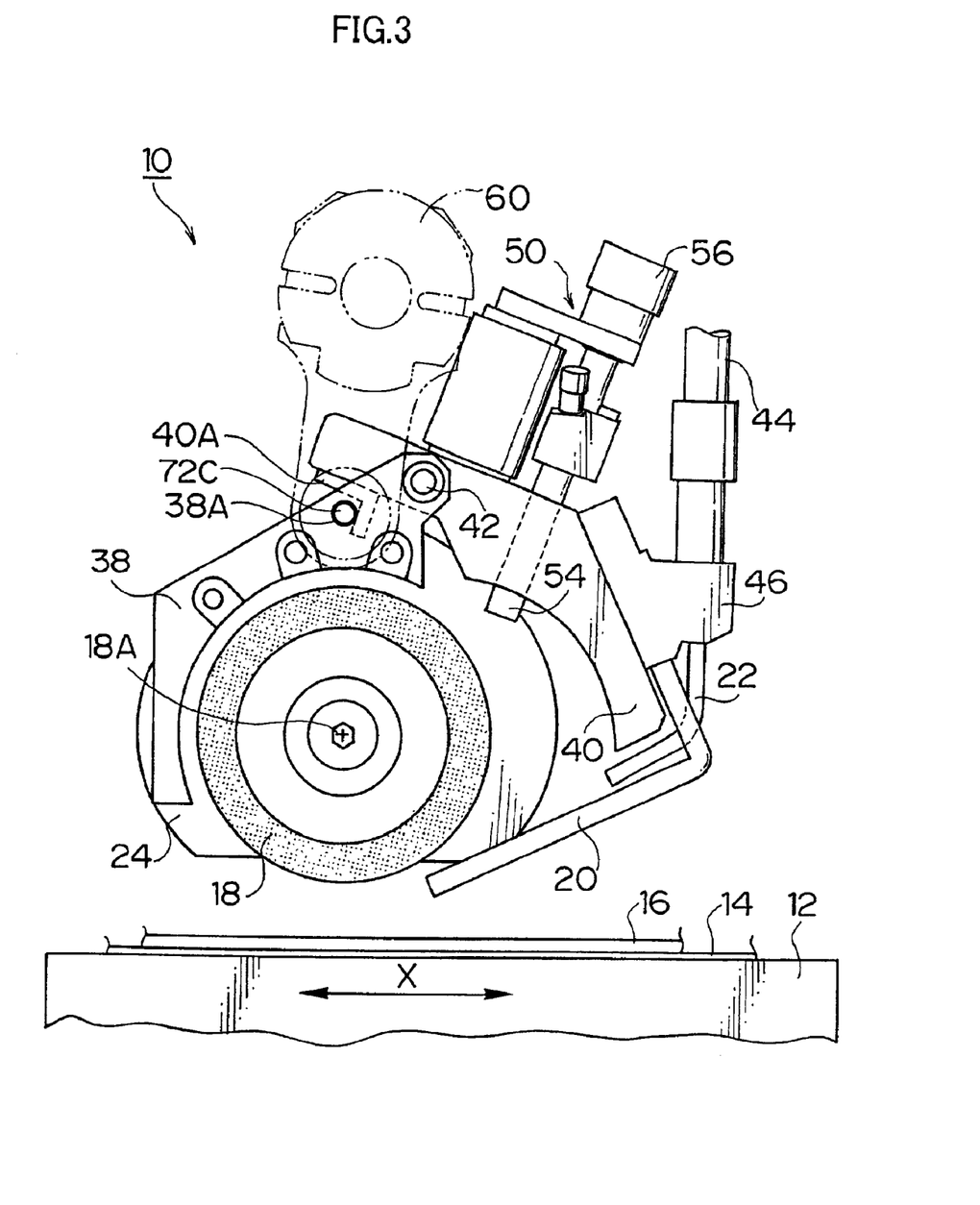
FIG. 3 is a front view showing that a cover of the dicing machine is in an opening position.

FIG. 1 is a front view of a dicing machine 10 with an interlock according to an embodiment of the present invention, FIG. 2 is a sectional side view of the dicing machine 10, and FIG. 3 is a front view showing that a cover of the dicing machine 10 is in an opening position.

In FIG. 1, the dicing machine 10 has a cutting table 12 which moves for cutting along the X direction in FIGS. 1 and 3. A work 16 is held on an adhesive sheet 14, which is held by suction on the cutting table 12 and is aligned. Then, the work 16 is diced with a blade 18 rotating at a high speed. In order to maintain manufacturing accuracy of the work 16, coolant and cutting solution are applied from a pair of coolant jetting nozzles 20 and a cutting solution jetting nozzle 22 to both sides of the blade 18 so that the blade 18 is cooled and cleaned while cutting the work 16.

In FIG. 2, a motor (spindle rotating motor) 24 driving the blade 18 has a tapering spindle 26, on which a flange 28 is mounted. An internal circumference tapering face 28A of the flange 28 is fit on a tapering face 26A of the spindle 26. The flange 28 is fixed on the spindle 26 with a flange fixing nut 30 screwed on the spindle 26. An annular hub 32 is fit on an external circumference part of the flange 28, and the blade 18 is fixed to the external circumference part of the hub 32 and in contact with a supporting face 28B of the flange 28. The hub 32 is fixed on the flange 28 with a hub fixing nut 34 screwed on the flange 28. Thus, the blade 18 is supported and fixed between the hub 32 and the supporting face 28B of the flange 28.

As shown in FIG. 1, the driving motor 24 is suspended from a Z table 90. The Z table 90 is guided along a Z guide 92, which is arranged on a Y table 94, and is driven along the Z direction by a ball screw and a stepping motor (not shown). The Y table 94 is guided along a Y guide (not shown), and is driven along the Y direction by a ball screw and a stepping motor (not shown). In this construction, the rotary blade 18 attached on the end of the spindle 26 is moved along the Z direction for cutting and along the Y direction for indexing.

Parts of the blade 18 except a cutting part are covered with a flange cover 36 as shown in FIG. 1. The flange cover 36 is divided into a first cover 40 and a second cover 38. The second cover 38 is fixed on a stationary member such as the driving motor 24, and the first cover 40 is turnably connected to the second cover 38 through a shaft 42, which is parallel with a rotary axis 18A of the blade 18.

The first cover 40 is provided with an L-shaped piece 40A. When the first cover 40 is positioned at a closing position shown in FIG. 1, an end of the L-shaped piece 40A is positioned side by side with a screw hole 38A formed on the second cover 38. When the first cover 40 is positioned at an opening position shown in FIG. 3, the end of the L-shaped piece 40A is positioned so as not to cover the screw hole 38A of the second cover 38.

The cutting solution jetting nozzle 22 for applying the cutting solution to the blade 18 and the pair of L-shaped coolant jetting nozzles 20 for applying the coolant to the blade 18 are attached on the first cover 40 through an attachment block 46. The nozzles 20 and 22 are connected to a supplying tube 44 in the attaching block 46.

As shown in FIG. 2, a blade breakage detector 50 for detecting breakage of the blade 18 is attached on the first cover 40. The blade breakage detector 50 is a unit comprising a light projecting part 52 including a light-emitting diode and an optical system, and a light receiving part 54 including a light receiving device and an optical system. The light projecting part 52 and the light receiving part 54 are arranged to face each other across the edge of the blade 18. The light receiving part 54 measures a luminous energy applied from the light projecting part 52 synchronously with the rotation of the blade 18 so that breakage of the blade 18 is detected. The initial position of the breakage detector 50 is finely adjusted by rotating a knob 56 in a screw mechanism (not shown).

When the first cover 40 is positioned at the closing position in FIG. 1, replacement of the blade 18 is obstructed by one of the coolant jetting nozzles 20 that is in this side (left-hand side in FIG. 2) of the blade 18, and the light receiving part 54 of the breakage detector 50. Since the cover 36 is constructed as described above, the first cover 40 can be turned between the closing position in FIG. 1 and the opening position in FIG. 3. When the first cover 40 is turned to the opening position in FIG. 3, the L-shaped coolant jetting nozzles 20 are moved from the lower part to the side of the blade 18, and the light projecting part 52 and the light receiving part 54 of the breakage detector 50 are moved from the diagonally upper part to the diagonal side of the blade 18. In this state, the blade 18 can be replaced.

Figure 4:
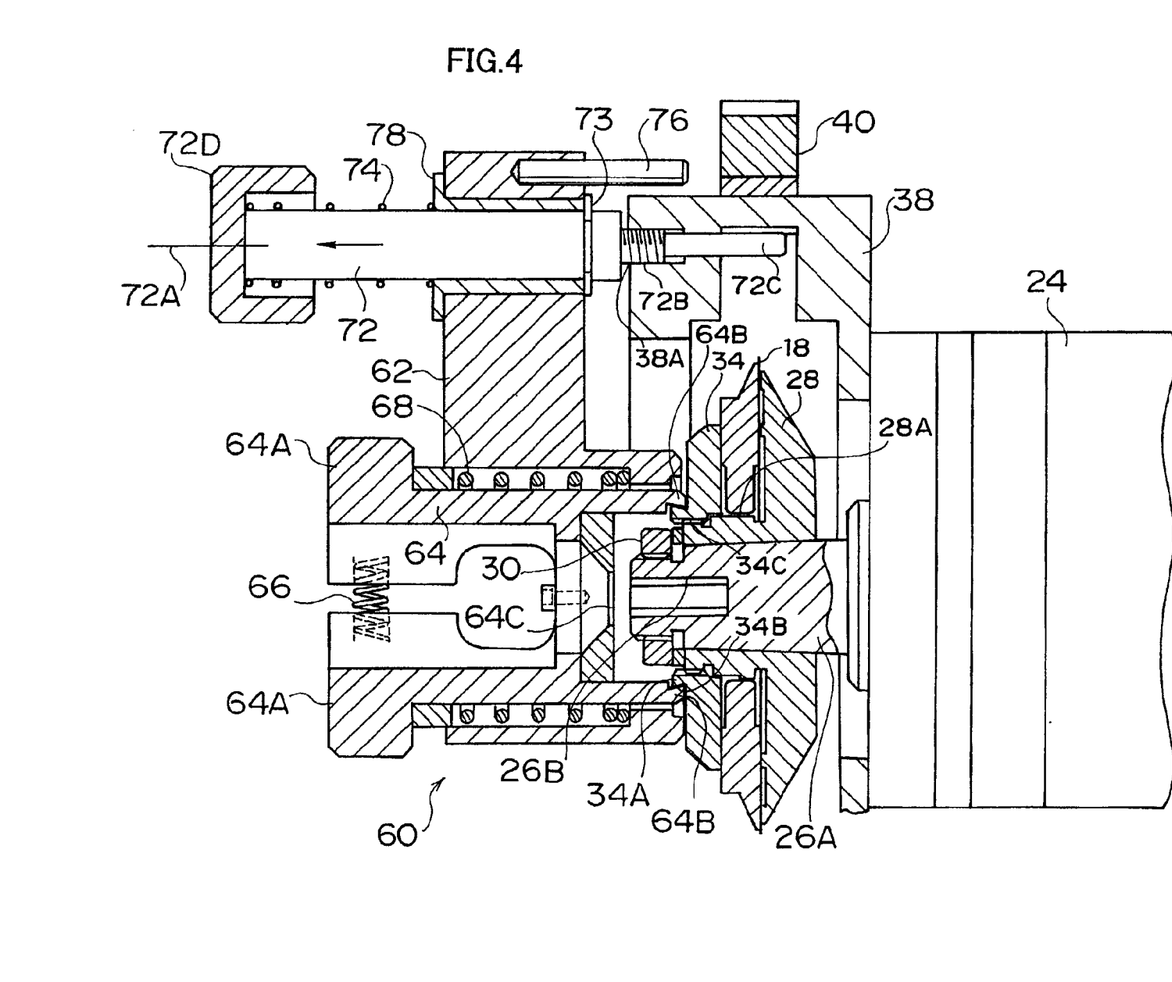
FIG. 4 is a sectional side view showing that a blade attaching and detaching device is attached on the dicing machine.
Figure 5:
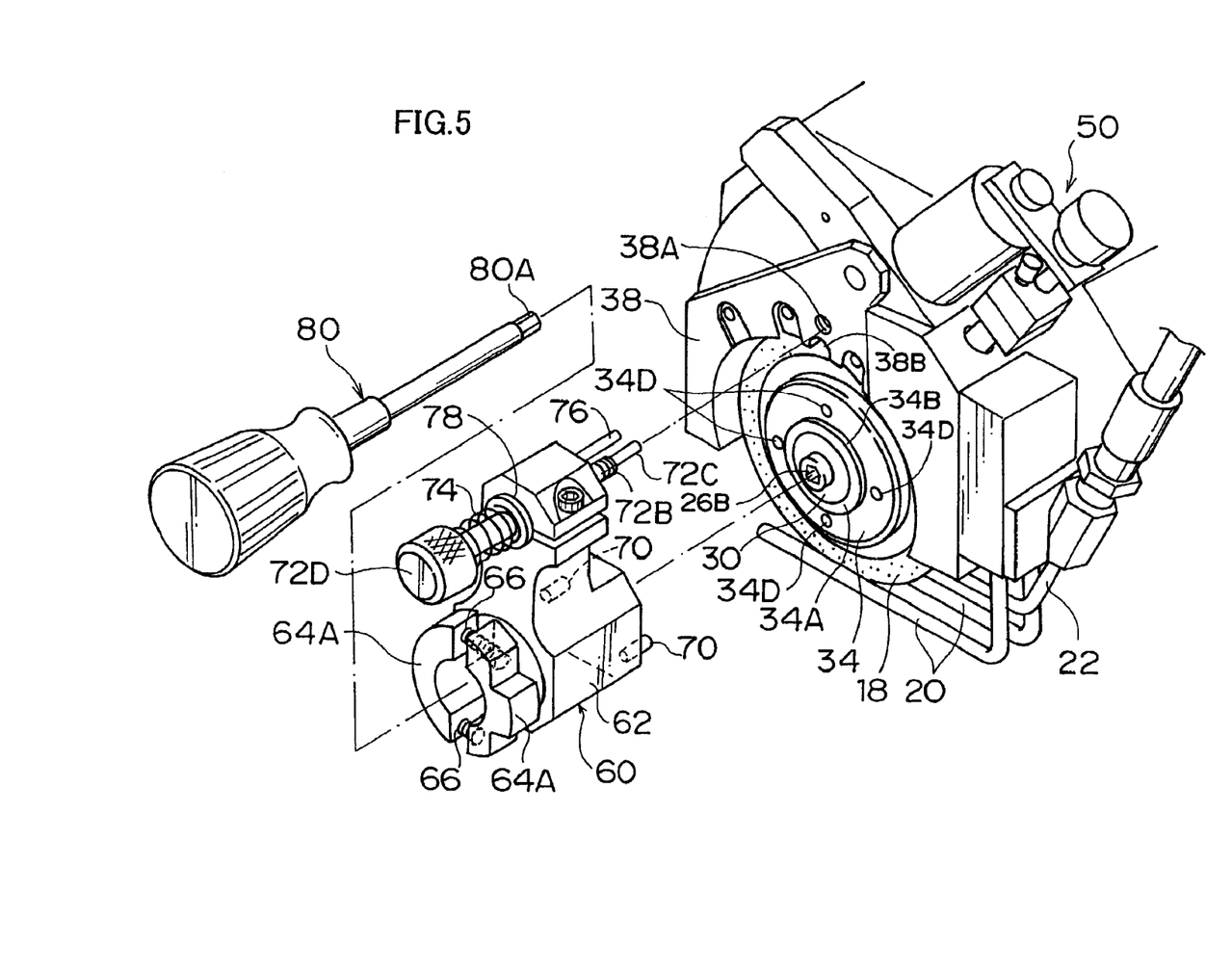
FIG. 5 is a perspective view explaining attachment of the blade attaching and detaching device.

Next, the replacement of the blade will be explained. FIG. 4 is a sectional side view showing that a blade attaching and detaching device 60 is attached on the second cover 38, and FIG. 5 is a perspective view explaining attachment of the blade attaching and detaching device 60.

First, a structure of the blade attaching and detaching device 60 will be explained. As shown in FIG. 4, the blade attaching and detaching device 60 comprises a body 62, a damper 64 and a shaft 72. As shown in FIG. 5, the body 62 has two rotation prevention pins 70 on a side facing the blade 18. The two rotation prevention pins 70 can be inserted in two opposite rotation prevention holes 34D among four rotation prevention holes 34D, which are formed on the hub fixing nut 34. The damper 64 has two hooks 64B on an end thereof, and the damper 64 holds a face 34B of a projection 34A formed on the hub fixing nut 34 with the hooks 64B. The projection 34A becomes gradually thicker toward the end thereof. The damper 64 has knob parts 64A on the other end thereof, and the knob parts 64A are pressed away from each other by small springs 66. When the operator bends the damper 64 from the outside of the knob parts 64A to press the springs 66, the hooks 64B are slightly moved away from each other. The damper 64 can rotate and slide with respect to the body 62, and is pressed by a large spring 68 in a direction to come out from the body 62; however, the damper 64 is prevented from coming off the body 62 by a stopper (not shown). The shaft 72 has a knurl part 72D on an end thereof, and has, on the other end, an attaching screw part 72B and a rod part 72C, of which diameter is smaller than the attaching screw part 72B. The shaft 72 is fitted in a bushing 78, which is fitted in the body 62, and the body 62 can rotate around the shaft 72 and slide along an axis 72A of the shaft 72. The shaft 72 is pressed by a middle spring 74 in a direction to come out from the body 62; however, the shaft 72 is prevented from coming off the body 62 by a snap ring 73 attached on the shaft 72.

In the procedure of the replacement of the blade 18 with the blade attaching and detaching device 60, the first cover 40, to which the coolant jetting nozzles 20 and the blade breakage detector 50 are attached, is first turned to the upper direction to be positioned at the opening position in FIG. 3. Next, the attaching screw part 72B of the shaft 72 of the blade attaching and detaching device 60 is screwed into the screw hole 38A of the second cover 38 as shown in FIG. 5, so that the blade attaching and detaching device 60 is attached to the second cover 38. In this state, the body 62 of the blade attaching and detaching device 60 is pressed toward the blade 18 by the middle spring 74. Then, the operator pinches the knobs 64A to open the hooks 64B, thrusts the clamper 64 toward the blade 18, and releases the knobs 64A, so that the hooks 64B hold the face 34B of the projection 34A of the hub fixing nut 34. Next, a hexagonal head 80A formed on the end of a torque wrench 80 is inserted into a hexagonal hole 26B formed on the end of the spindle 26 through a center opening 64C of the body 62, and the torque wrench 80 is rotated so that the spindle 26 and the hub fixing nut 34 are rotated together. On the rotation of the hub fixing nut 34, when the two rotation prevention pins 70 arranged on the body 62 of the blade attaching and detaching device 60 overlap with opposite two of the four rotation prevention holes 34D formed on the hub fixing nut 34, the rotation prevention pins 70 are inserted into the two of the rotation prevention holes 34D, since the body 62 is pressed toward the hub fixing nut 34 by the middle spring 74. In this state, the torque wrench 80 is rotated so that the spindle 26 is rotated with respect to the hub fixing nut 34 to the direction to loosen the hub fixing nut 34 (generally, the same direction to which the blade 18 rotates). As the hub fixing nut 34 is loosened, the body 62 of the blade attaching and detaching device 60 slides to the direction of the arrow in FIG. 4, and the hub fixing nut 34 finally comes off. Next, while the hooks 64B of the damper 64 hold the hub fixing nut 34, the body 62 is rotated to the upper direction around the shaft 72 to the position shown with alternate long and two short dashes lines in FIG. 3. In this position, a pin 76 provided on the body 62 is inserted into a notch 38B formed on the second cover 38 shown in FIG. 5, so that the body 62 does not fall down when the body 62 is released. In this state, the operator removes the hub 32 along with the blade 18 from the flange 28, and the same or another hub 32 to which a new blade 18 is attached is mounted to the flange 28. Thereafter, procedures reverse to the above-described procedures to remove the hub fixing nut 34 are performed, so that the hub fixing nut 34 is attached. Since the torque wrench 80 is used to drive the hub fixing nut 34, the blade 18 is not damaged by an excess driving force.

After the exchanging of the blades 18, the blade attaching and detaching device 60 is removed from the second cover 38, the first cover 40 is returned to the predetermined closing position, and the processing of the works is resumed. The procedures of exchanging the blades 18 are performed as described above.

Next, the mechanism of the interlock according to the present embodiment is explained.

When the first cover 40 is positioned at the closing position shown in FIG. 1, in the optical blade breakage detector 50 on the first cover 40, a part of the light emitted from the light projecting part 52 is blocked off by the blade 18 as shown in FIG. 2. A luminous energy received by the light receiving part 54 is thus considerably reduced, as compared with the state where the light emitted from the light projecting part 52 is not blocked. Hence, if the luminous energy is not reduced, it is determined that the first cover 40 remains positioned at the opening position in FIG. 3 or the blade 18 is not attached, and the processing of the works is not started.

When the blade attaching and detaching device 60 is attached on the second cover 38, the rod part 72C of the shaft 72 of the blade attaching and detaching device 60 shown in FIGS. 4 and 5 protrudes through the screw hole 38A of the second cover 38. In this state, the L-shaped piece 40A attached on the first cover 40 is in contact with the rod part 72C as shown in FIG. 3, so that the first cover 40 cannot return to the closing position. Hence, the luminous energy received by the light receiving part 54 is not reduced, and the processing of the works is not started.

Figure 6:
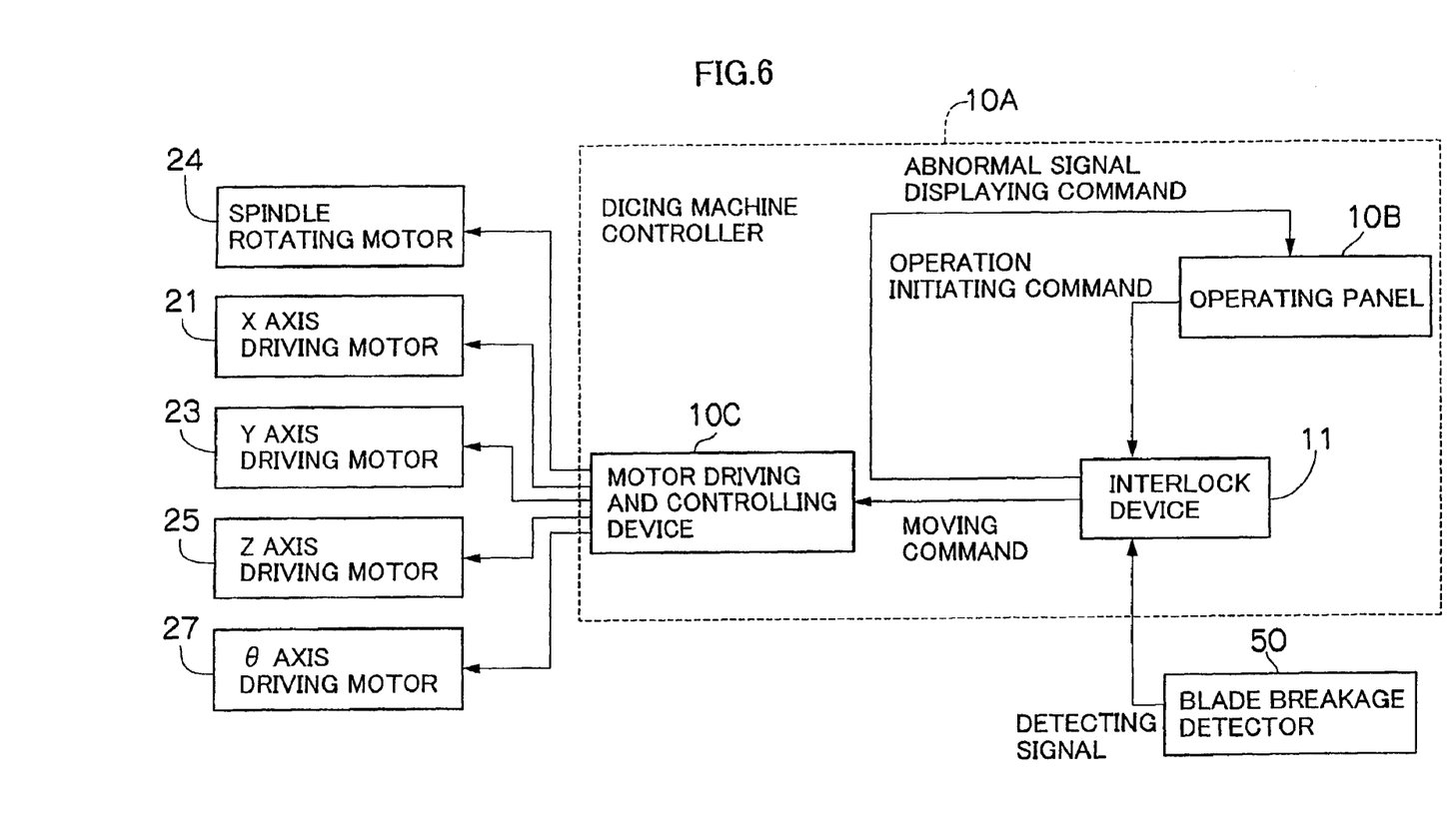
FIG. 6 is a block diagram explaining an operation system of the interlock in the embodiment.

FIG. 6 is a block diagram explaining the operation system of the interlock device according to the above-described embodiment of the present invention. When the operator makes an operation panel 10B of a dicing machine controller 10A issue an operation initiating command of the dicing machine 10, the interlock device 11 receives a luminous energy signal of the blade breakage detector 50, and determines whether the luminous energy signal is reduced. In the case that the luminous energy signal is reduced by a predetermined amount, the interlock device 11 issues an operation command to a motor driving and controlling device 10C. When receiving the operation command, the motor driving and controlling device 10C drives and controls the spindle rotating motor 24, an X axis driving motor 21, a Y axis driving motor 23, a Z axis driving motor 25, and a θ axis driving motor 27. In the case that the luminous energy signal is not reduced by the predetermined amount, the interlock device 11 does not issue the operation command to the motor driving and controlling device 10C, and outputs an abnormal signal displaying command to the operation panel 10B. When receiving the abnormal signal displaying command, the operation panel 10B displays a warning of abnormality.

As described above, the output of the blade breakage detector 50 is checked when the operation initiating command of the dicing machine 10 is issued, so that the interlock device 11 can prevent the first cover 40 from remaining opened, the blade attaching and detaching device 60 from remaining installed, and the blade 18 from remaining detached.

Figure 7:
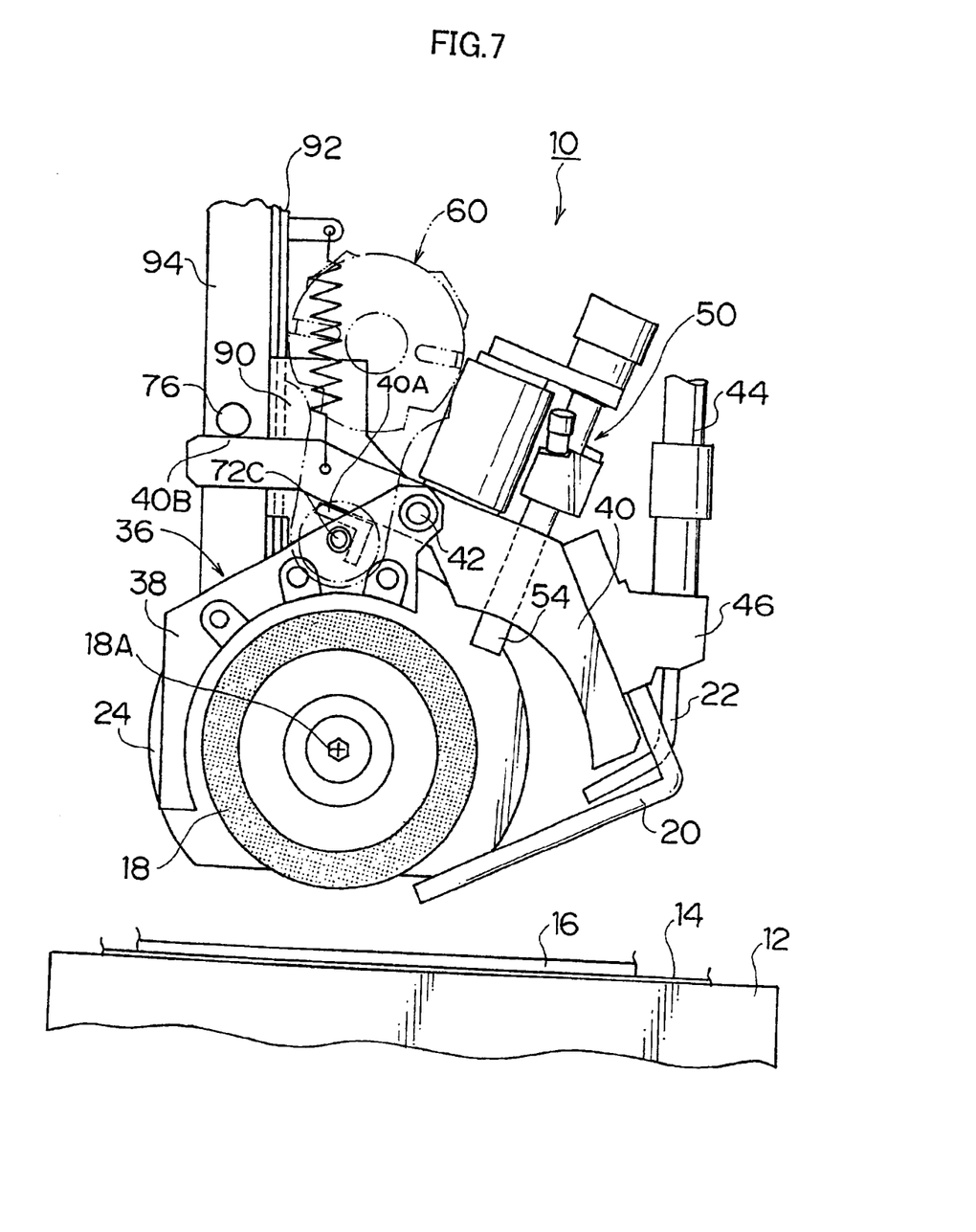
FIG. 7 is a front view of another dicing machine for which the interlock is applied.

Some dicing machines are constructed so that the first cover 40 opens and closes automatically by following the up and down movement of the driving motor 24 as shown in FIG. 7. In such a dicing machine, since the first cover 40 opens and closes automatically, the first cover 40 is always closed when the processing of the works is resumed. However, since many operations are automated, the operator tends to forget to remove the blade attaching and detaching device 60 from the dicing machine 10. In such a dicing machine, the interlock device according to the present invention is effective.

In the above-described embodiment, the flange cover 36 is divided into two, and the first cover 40 rotates upward and downward so as to open and close. However, the flange cover 36 is not limited to be divided into two and can be divided into three or more as the need arises; moreover, the first cover 40 is not limited to rotate upward and downward.

As described above, according to the dicing machine with interlock of the present invention, the blade breakage detector is utilizes so that the interlock device can prevent the openable flange cover from remaining opened, the blade attaching and detaching device from remaining installed, and the rotary blade from remaining detached when the processing of the works is resumed after the replacement of the rotary blade.

Thus, the blade and the work are prevented from being damaged by processing the work without applying the coolant, the mechanism of the dicing machine and the blade attaching and detaching device are prevented from being damaged by operating the dicing machine without detaching the blade attaching and detaching device, and the work is prevented from being unprocessed but sent out by operating the dicing machine without attaching the blade.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A dicing machine which processes a work with a rotary blade, the dicing machine comprising:
   a spindle on which the rotary blade is attached and which is rotated by a spindle rotating motor;
   a turnable cover which covers the rotary blade during processing of the work, the turnable cover being turned about a turning axis from a closing position to an opening position when replacing the rotary blade, the turnable cover being returned from the opening position to the closing position in order to resume the processing, said turning axis being substantially parallel to the spindle;
   a blade breakage detector which is operable for detecting breakage of the rotary blade, the blade breakage detector being arranged on the turnable cover for turning therewith; and
   an interlock device which is operable for issuing an operation initiating command to a motor driving and controlling device to drive the spindle rotating motor which rotates the spindle to which the rotary blade is attached and for preventing the processing of the work when the following conditions are present:
   the rotary blade remains detached and/or
   the turnable cover remains opened,
   wherein the blade breakage detector is an optical detector including a light projection part and a light receiving part arranged to face each other across the edge of the blade,
   wherein the interlock device is controlled by a signal received from the blade breakage detector,
   wherein the signal from the blade breakage detector is generated for preventing the processing when the turnable cover is in the opening position or when the rotary blade is detached, and the signal from the blade breakage detector is generated for resuming the processing when the turnable cover is in the closing position and when the rotary blade is attached to the spindle.

2. A dicing machine which processes work with a rotary blade, the dicing machine comprising:
   a spindle on which the rotary blade is attached and which is rotated by a spindle rotating motor;
   a stationary cover and a turnable cover which cover the rotary blade during processing of the work, the turnable cover being turned from a closing position to an opening position when replacing the rotary blade, the turnable cover being returned from the opening position to the closing position in order to resume the processing;
   a blade breakage detector which is operable for detecting breakage of the rotary blade, the blade breakage detector being arranged on the turnable cover;
   a blade attaching and detaching device which is mounted on the stationary cover when replacing the rotary blade and the blade attaching and detaching device being detached from the stationary cover in order to resume the processing; and
   an interlock device which is operable for issuing an operation initiating command to a motor driving and controlling device to drive the spindle rotating motor which rotates the spindle to which the rotary blade is attached and for preventing the processing of the work when the following condition is present:

the blade attaching and detaching device remains mounted on the stationary cover, wherein the blade breakage detector is an optical detector including a light projection part and a light receiving part arranged to face each other across the edge of the blade, wherein the interlock device is controlled by a signal received from the blade breakage detector, wherein the blade attaching and detaching device is prevented from being mounted on the stationary cover when the turnable cover is positioned at the closing position, and the blade attaching and detaching device is attachable to the stationary cover when the turnable cover is positioned in the opening position, and wherein the signal from the blade breakage detector is generated for preventing the processing when the turnable cover is in the opening position or when the blade attaching and detaching device is attached to the stationary cover, and the signal from the blade breakage detector is generated for resuming the processing when the turnable cover is in the closing position and when the blade attaching and detaching device is detached from the stationary cover.

\* \* \* \* \*